May 5, 1964            H. C. SWIFT            3,131,787

AUTOMATIC BRAKE ADJUSTING MECHANISM

Filed Nov. 26, 1962            2 Sheets-Sheet 1

INVENTOR.
Harvey C. Swift
BY
Harness, Dickey & Pierce
ATTORNEYS

May 5, 1964 H. C. SWIFT 3,131,787
AUTOMATIC BRAKE ADJUSTING MECHANISM
Filed Nov. 26, 1962 2 Sheets-Sheet 2
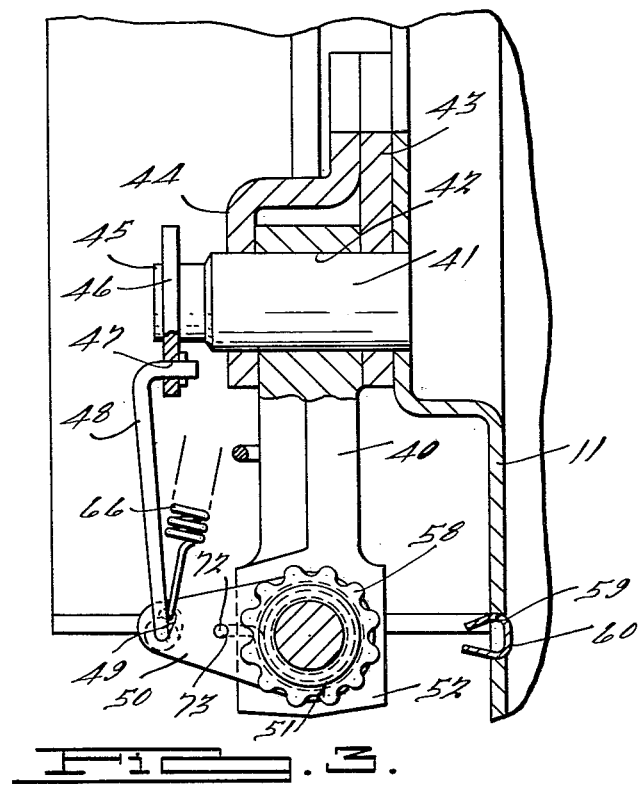
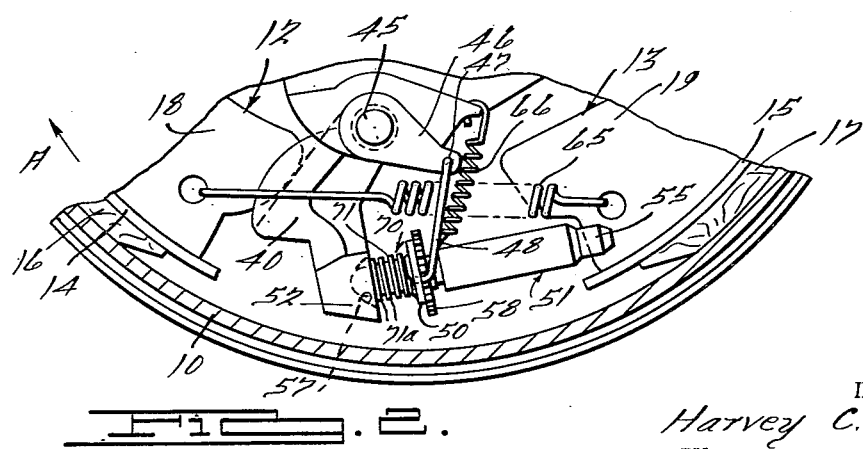
INVENTOR.
Harvey C. Swift.
BY
Harness, Dickey & Pierce
ATTORNEYS.

United States Patent Office 3,131,787
Patented May 5, 1964

1

3,131,787
AUTOMATIC BRAKE ADJUSTING MECHANISM
Harvey C. Swift, Birmingham, Mich., assignor to Kelsey-Hayes Company, Romulus, Mich., a corporation of Delaware
Filed Nov. 26, 1962, Ser. No. 239,962
8 Claims. (Cl. 188—79.5)

This invention relates to brakes of the type comprising an annular brake drum and arcuate brake shoes and, more particularly, to means for automatically adjusting the brakes when the wear on the brake shoes requires such adjustment.

An important object of this invention is to provide an automatic adjuster for the brake shoes which is of such simple construction and so reduced in the number of its component parts as to approach the practical limits of structural simplicity.

Another object of the invention is to provide a brake adjusting means of this type wherein the structural simplicity of the device produces a substantial economy in its manufacturing, installation and maintenance costs.

A further object of the invention is to provide an automatic adjuster of this type which may also be manually adjusted so that the adjuster can be manually reset to accommodate replacement shoes.

A further object is to provide an automatic adjuster so constructed that it may be installed on a brake which was not originally adapted for the invention.

A still further object of the invention is to provide automatic adjusting means of this type which is rendered operative only when the brakes are applied with the vehicle moving in a reverse direction and which does not interfere with the normal operation of the brakes during the forward movement of the vehicle.

The objects of this invention are attained by the use of a coiled spring type clutch adapted to embrace the movable part of an adjustable strut located between adjacent ends of the brake shoes. Brake actuating mechanism, having a movable part, is also located between said adjacent brake shoe ends. The clutch is connected to the movable part of said brake actuating mechanism whereby upon movement of said brake actuating mechanism in one direction, said clutch will engage the movable part of the adjustable strut to actuate the same to extend the adjustable strut. This arrangement provides an extremely simple mechanism for accomplishing the objects of this invention.

The various objects and advantages, and the novel details of construction of one commercially practical embodiment of the invention, will become more apparent as this description proceeds, especially when considered in connection with the accompanying drawings, in which:

FIGURE 2 is a fragmentary view of the adjusting mechanism shown at the lower part of FIGURE 1 with the brake shoe moving in the reverse direction;

FIGURE 3 is a fragmentary sectional view taken substantially on the plane indicated by line 3—3 in FIGURE 1.

Figure 1:
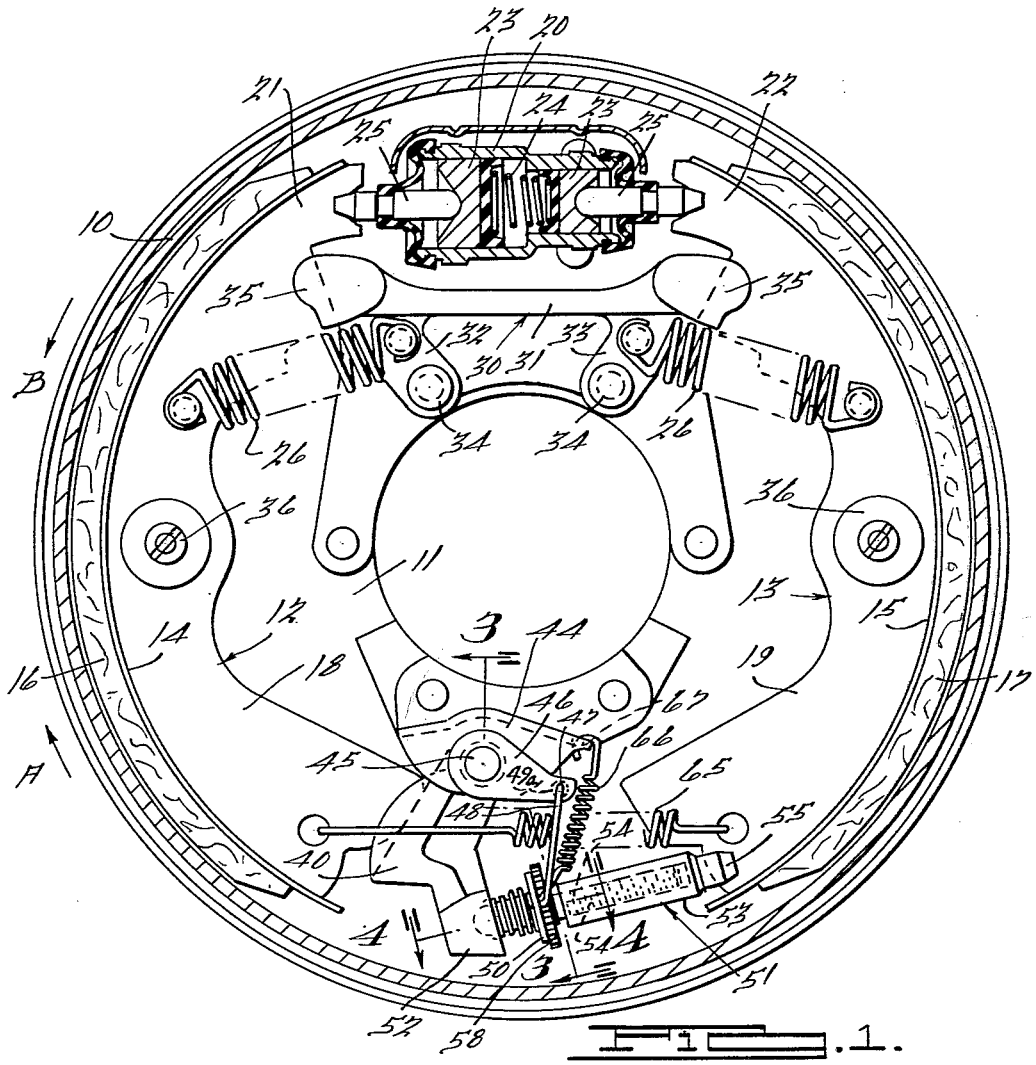
FIGURE 1 is a sectional elevational view of a brake incorporating the features of this invention, the brake shoes being shown in released position.

An illustrative embodiment of the invention is shown in the drawings as applied to a brake structure of the internal expanding type comprising arcuate brake shoes adapted to cooperate with the inner surface of a brake drum. In FIGURE 1, the reference character 10 indicates a brake drum mounted on the wheel hub of a

2 vehicle (not shown) for rotation therewith. A stationary backing plate 11 is mounted on a stationary part (not shown) of the vehicle.

The basic elements of the brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15.

A hydraulic wheel or brake cylinder 20 is interposed between the adjacent ends 21 and 22 of the brake shoes 12 and 13. This wheel cylinder is of a substantially conventional construction and comprises a pair of pistons 23 urged apart by a light spring 24. The pistons 23 operate plungers 25 extending from opposite ends of the brake cylinder for engagement with the webs 18 and 19 and provide the actuating means for moving the brake shoes 12 and 13 into engagement with the brake drum 10. Hydraulic fluid is delivered to the brake cylinder 20 between the pistons 23 from a conventional brake pedal operated master cylinder (not shown). Retraction springs 26 normally retain the ends of the brake shoes in engagement with the plungers 25 and with a stationary anchor, yet to be described.

Secured to the backing plate 11 is a torque-resisting member 30 which consists essentially of a transverse strut 31 connecting spaced arms 32 and 33. The torque-resisting member is secured to the backing plate by means of rivets, bolts, or the like 34, so as to be rigid therewith. The arms 32 and 33 are provided with bifurcated portions 35 adapted to slidably engage the ends 21 and 22 of the brake shoes to provide anchors for the brake shoes 12 and 13.

Each brake shoe is guided and held in proper relation to the backing plate 11 by means of a conventional hold-down device 36.

The other ends of the brake shoes 12 and 13, in brakes of this type, are interconnected by mechanism which includes a power reducing lever 40 pivotally mounted on a pivot pin 41. The pivot pin 41 has a press fit as at 42 with the lever 40 and is rotatably mounted in a housing which consists of plates 43 and 44, the plate 44 having a portion spaced from the plate 43 to form a housing to receive the end of the lever 41, as shown best in FIGURE 3. The housing 43–44 is rigidly secured to the backing plate 11.

The pivot pin 41 is provided with an extension 45 and rigidly secured to this extension is a lever 46 provided at its end with an aperture 47 to receive the end of a connecting link 48. The other end of this link 48 slidably engages a slot 49 formed in the end of a lever 50 rotatably mounted adjacent the end of an adjustable strut 51 which extends between the free end 52 of the arm 40 and the adjacent end of the brake shoe 13.

The ends of the brake shoes 12 and 13 are retained in engagement with the arm 40 and adjustable strut 51 by means of a tension spring 65. It will also be obvious that the slidable connection provided by the slot 49 may be in the lever 46, instead of in the lever 50 as shown in dotted lines at 49a in FIGURE 1.

Figure 4:
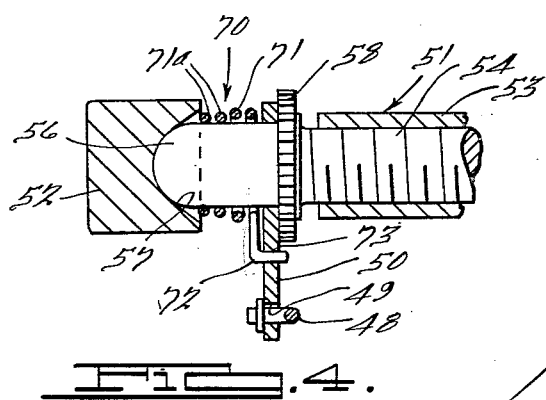
FIGURE 4 is a fragmentary sectional view taken substantially on the plane indicated by line 4—4 in FIGURE 1.

As shown best in FIGURE 4, the adjustable strut 51 comprises a tubular internally threaded nut or sleeve 53 which receives a threaded stem 54 so that relative rotation in one direction between the parts 53 and 54 will cause an extension of the adjustable strut 51. The end 55 of the sleeve 53 is slotted to receive the adjacent end of the web 19 of the brake shoe 13, thus preventing rotation of the sleeve 53. The stem 54, at its exposed end, is provided with a nonthreaded stub shaft or stem 56 which engages in a socket 57 in the free end 52 of the arm 40. The lever 50 is rotatably mounted on this stub shaft or stem portion 56.

Adjustable struts of this type are usually provided with a toothed wheel 58 fixed to the threaded stem 54 for manual adjustment of the adjustable strut. In the construction shown, the strut and therefore the brake shoes may be manually adjusted by engaging the toothed wheel 58 with a tool inserted through an access opening 59 in the backing plate 11 of the brake drum. This access opening is normally closed by a removable cover plate 60.

In accordance with this invention, the adjustable strut 51 is adapted to be automatically adjusted by means of a one-way clutch 70 in the form of a helical coil spring 71 surrounding or embracing the stub shaft or stem 56 of the threaded stem 54. The coils of this spring are wound right-handed, so that when the end 72 of the spring which engages an aperture 73 in the lever 50 is moved upwardly, as viewed in the drawings, the spring will be tightened upon the stub shaft 56 so as to grip the same and rotate the stem 54 to thus adjust the adjustable strut. To facilitate this, the first one or two convolutions 71a of the spring are wound more tightly around the stub shaft or stem 56 than the remaining convolutions. When the end of the spring is moved in the opposite direction, the spring will unwind and slip on the stub shaft 56 so as to occupy a new position thereof preparatory to the next adjusting operation of the adjustable strut. A tension spring 66 has one end engaging the slot 49 and the other end engaging an aperture 67 in the housing member 44 to rotate the lever 50 in an upward direction to wind the spring 71 about the stub shaft 56 and rotate the threaded stem 54. The structure just described provides a simple but effective one-way clutch for adjusting the adjustable strut.

The one-way clutch is disengaged and moved to a new position on the stub shaft 56 when the brake drum 10 and the brake shoe 12 are moved in a reverse direction indicated by the arrow A. This occurs upon application of the brakes while the vehicle is moving in a reverse direction. During this movement of the brake shoe, the arm 40 swings to the left, as seen, for instance, in FIGURE 2. This swings the lever 46 downwardly and through the link 48 moves the lever 50 downwardly. Inasmuch as the end 72 of the spring is secured to the lever 50, this will unwind the spring to release its grip on the stub shaft 56 and position the spring in a new location preparatory to the next adjusting operation and at the same time will tension or load spring 66. When the brake drum and brake shoe 12 move in the direction of arrow B, which they do when the brakes are applied when the vehicle is moving in a forward direction, the arm 40 swings to the right and the lever 46 will swing upwardly, as viewed in FIGURE 1, and through the link 48 will move the lever 50 upwardly under the influence of spring 66. This moves the end 72 of the spring clutch upwardly to tighten the spring about the stub shaft 56 to grip the same. The continued movement of these parts will rotate the stem 54 of the adjustable strut to extend the strut and thus adjust both brake shoes.

It will be understood that the one-way clutch is positioned to adjust the adjustable strut only when the brakes are applied while the vehicle is moving in a reverse direction. The adjustment is made when the brakes are applied while the vehicle is moving in a forward direction. The slot 49 which provides a slidable connection between the lever 50 and the link 48 permits normal operation of the brake without affecting the one-way clutch. Mechanical losses and slippage of the spring 71 on the stub shaft 56 will prevent overadjustment of the brakes in the event of overheated brake drums, or if no adjustment is required.

It will be apparent from the above description of the device that an automatic adjuster is provided which is so reduced in the number and character of its component parts as to approach the practical limits of structural simplicity. Also, the device comprises a minimum number of simple parts whereby it may be manufactured, installed and maintained at a minimum cost. Moreover, the device is so constructed that it may be installed on a brake which was not originally adapted for the invention.

While a commercially practical embodiment of the invention has been described and illustrated herein somewhat in detail, it will be understood that various changes may be made as may come within the purview of the accompanying claims.

What is claimed is:

1. In a brake mechanism comprising a pair of brake shoes, a brake drum, means for moving said brake shoes into engagement with said brake drum, brake actuating mechanism between adjacent ends of said brake shoes, said actuating mechanism including a movable part, and an adjustable strut having a movable part located between said brake shoe ends, that improvement which comprises, a helical coil spring clutch surrounding said movable strut part and adapted when tightened to grip and rotate the same and means connecting said clutch to the movable part of said brake actuating mechanism for actuation thereby.

2. In a brake mechanism comprising a pair of brake shoes, a brake drum, means for moving said brake shoes into engagement with said brake drum, brake actuating mechanism between adjacent ends of said brake shoes, said actuating mechanism including a movable part, and an adjustable strut having a movable part located between said brake shoe ends, that improvement which comprises a helical coil spring clutch embracing said movable strut part and adapted when tightened to grip and rotate the same, and means connecting said clutch to the movable part of said brake actuating mechanism to engage said clutch with said movable strut part upon movement of said movable part of the brake actuating mechanism in one direction to extend the adjustable strut.

3. In a brake mechanism comprising a pair of brake shoes, a brake drum, means for moving said brake shoes into engagement with said brake drum, brake actuating mechanism between adjacent ends of said brake shoes, said actuating mechanism including a movable part, and an adjustable strut having a movable part located between said brake shoe ends, that improvement which comprises, a helical coil spring clutch surrounding said movable strut part and adapted when tightened to grip and rotate the same, and means connecting said clutch to the movable part of said brake actuating mechanism whereby movement of said movable part in one direction will cause said clutch to operatively engage said movable strut part to actuate the same, and movement of said movable part in the other direction will cause said clutch to be operatively disengaged from said movable strut part.

4. In a brake mechanism comprising a pair of brake shoes, a brake drum, means for moving said brake shoes into engagement with said brake drum, brake actuating mechanism between adjacent ends of said brake shoes, said actuating mechanism including a movable part, and an adjustable strut having a movable part located between said brake shoe ends, that improvement which comprises, a helical coil spring surrounding said movable strut part and acting as a one-way clutch, and means connecting one end of said spring to the movable part of said brake actuating mechanism, whereby movement of said movable part in one direction will tighten said spring on said movable strut part and rotate the same to extend the adjustable strut, and movement of said movable part in the other direction will unwind said spring to operatively disengage the same from said movable strut part.

5. In a brake mechanism comprising a pair of brake shoes, a brake drum, a backing plate, means at one end of said brake shoes for moving the same into engagement with said brake drum, a pivotally mounted power reducing lever at the other end of said brake shoes having an intermediate portion engaging one of said brake shoes and having a free end, means pivotally mounting said lever on said backing plate, and an adjustable strut having a movable part extending between the free end of said lever and the other brake shoe, that improvement which comprises, a helical coil spring surrounding said movable strut part and acting as a one-way clutch, a second lever mounted for movement with said power reducing lever, and means connecting said second lever to one end of said spring whereby movement of said second lever in one direction will tighten said spring on said movable strut part and rotate the same to extend the adjustable strut, and movement of said second lever in the other direction will unwind said spring to operatively disengage the same from said movable strut part.

6. In a brake mechanism comprising a pair of brake shoes, a brake drum, a backing plate, means at one end of said brake shoes for moving the same into engagement with said brake drum, a pivotally mounted power reducing lever at the other end of said brake shoes having an intermediate portion engaging one of said brake shoes and having a free end, means pivotally mounting said lever on said backing plate, and an adjustable strut having a movable part extending between the free end of said lever and the other brake shoe, that improvement which comprises, a helical coil spring surrounding said movable strut part and acting as a one-way clutch, a second lever mounted on the pivot of said power reducing lever for movement therewith, a third lever pivotally mounted on said adjustable strut and connected to one end of said spring, and a link connecting said second and third levers, whereby movement of said parts in one direction will tighten said spring on said movable strut part and rotate the same to extend the adjustable strut and movement of said parts in the other direction will unwind said spring to operatively disengage the same from said movable strut part.

7. A structure as described in claim 6 in which one of said second or third levers has a slot in which the end of said link engages.

8. A structure as described in claim 6 in which a retraction spring is connected to said third lever and a fixed anchor to move said third lever in the direction to tighten said spring on said movable strut part.

References Cited in the file of this patent

UNITED STATES PATENTS

| | | |
|---|---|---|
| 1,125,035 | Anderson | Jan. 19, 1915 |
| 1,974,943 | Baits | Sept. 25, 1934 |

FOREIGN PATENTS

| | | |
|---|---|---|
| 612,360 | Great Britain | Nov. 11, 1948 |